United States Patent
Layet et al.

(10) Patent No.: US 12,409,938 B2
(45) Date of Patent: Sep. 9, 2025

(54) SEAT ARRANGEMENTS, IN PARTICULAR FOR AN AIRCRAFT CABIN

(71) Applicant: Safran Seats, Plaisir (FR)

(72) Inventors: Julien Layet, La Chapelle Saint Ursin (FR); Julien Fosset, Bourges (FR)

(73) Assignee: Safran Seats, Plaisir (FR)

( * ) Notice: Subject to any disclaimer, the term of this patent is extended or adjusted under 35 U.S.C. 154(b) by 145 days.

(21) Appl. No.: 17/627,486

(22) PCT Filed: Jul. 8, 2020

(86) PCT No.: PCT/EP2020/069283
§ 371 (c)(1),
(2) Date: Jan. 14, 2022

(87) PCT Pub. No.: WO2021/008974
PCT Pub. Date: Jan. 21, 2021

(65) Prior Publication Data
US 2022/0242572 A1  Aug. 4, 2022

(30) Foreign Application Priority Data
Jul. 18, 2019  (FR) ..................... 1908144

(51) Int. Cl.
*B64D 11/06* (2006.01)
(52) U.S. Cl.
CPC ................ *B64D 11/0606* (2014.12)
(58) Field of Classification Search
CPC ............ B64D 11/0601; B64D 11/0602; B64D 11/0604; B64D 11/0606; B64D 11/0023; B64D 11/06
See application file for complete search history.

(56) References Cited

U.S. PATENT DOCUMENTS 10,237,511 B2 * 3/2019 Garing ................. H04N 5/7408
11,319,072 B2 * 5/2022 Henshaw ........... B64D 11/0601
(Continued)

FOREIGN PATENT DOCUMENTS

CA  3033918 A1 *  2/2018  ......... B64D 11/0601
EP  3225548 A1   10/2017
(Continued)

OTHER PUBLICATIONS

International Patent Application No. PCT/EP2020/069283, International Search Report (with English translation) and Written Opinion, dated Sep. 16, 2020.

*Primary Examiner* — Joshua D Huson
*Assistant Examiner* — Anna L. Gordon
(74) *Attorney, Agent, or Firm* — Kilpatrick Townsend & Stockton LLP

(57) ABSTRACT

A seat arrangement for an aircraft cabin includes a first column of seats extending on one side of an aisle, a second column of seats extending on an opposite side of the aisle, and a door. The seats of the second column are staggered with respect to the seats of the first column. The door can move between a stowed position and a deployed position in which the door closes an upper space located above a console of the first column. The upper space is defined by a shell associated with the console and by a shell associated with a front seat. A lower space can extend between the front end of the console and the shell of the front seat being left free. The lower space communicates with the upper space to form an access passage when the door is in the stowed position.

13 Claims, 7 Drawing Sheets

(56) References Cited

U.S. PATENT DOCUMENTS

| | | | | |
|---|---|---|---|---|
| 2013/0038103 A1* | 2/2013 | Scott | ............... | B60N 2/3025 |
| | | | | 297/248 |
| 2013/0160240 A1 | 6/2013 | Kenny | | |
| 2013/0241247 A1* | 9/2013 | Wallace | ......... | B64D 11/0604 |
| | | | | 297/118 |
| 2016/0272323 A1* | 9/2016 | Carlioz | ......... | B64D 11/0602 |
| 2017/0172301 A1* | 6/2017 | Janzen | ............ | A47B 88/493 |
| 2018/0281963 A1* | 10/2018 | Dowty | ......... | B64D 11/0606 |

FOREIGN PATENT DOCUMENTS

| | | | | |
|---|---|---|---|---|
| EP | 3225551 A1 | 10/2017 | | |
| FR | 3059951 A1 | 6/2018 | | |
| GB | 2548901 A | 10/2017 | | |
| WO | 2012140515 A1 | 10/2012 | | |
| WO | 2018033599 A1 | 2/2018 | | |
| WO | WO-2018093825 A1 * | 5/2018 | ............ | B60N 2/005 |
| WO | WO-2018184778 A1 * | 10/2018 | ......... | B64D 11/0023 |
| WO | WO-2019179638 A1 * | 9/2019 | ......... | B64D 11/0015 |

\* cited by examiner

[Fig. 1]
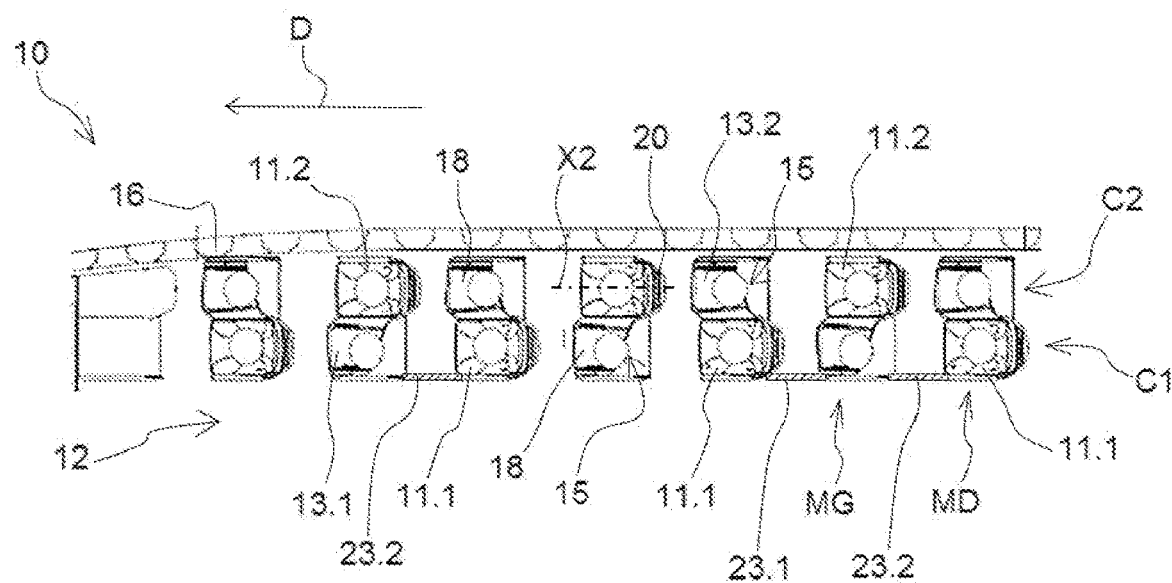
[Fig. 2]
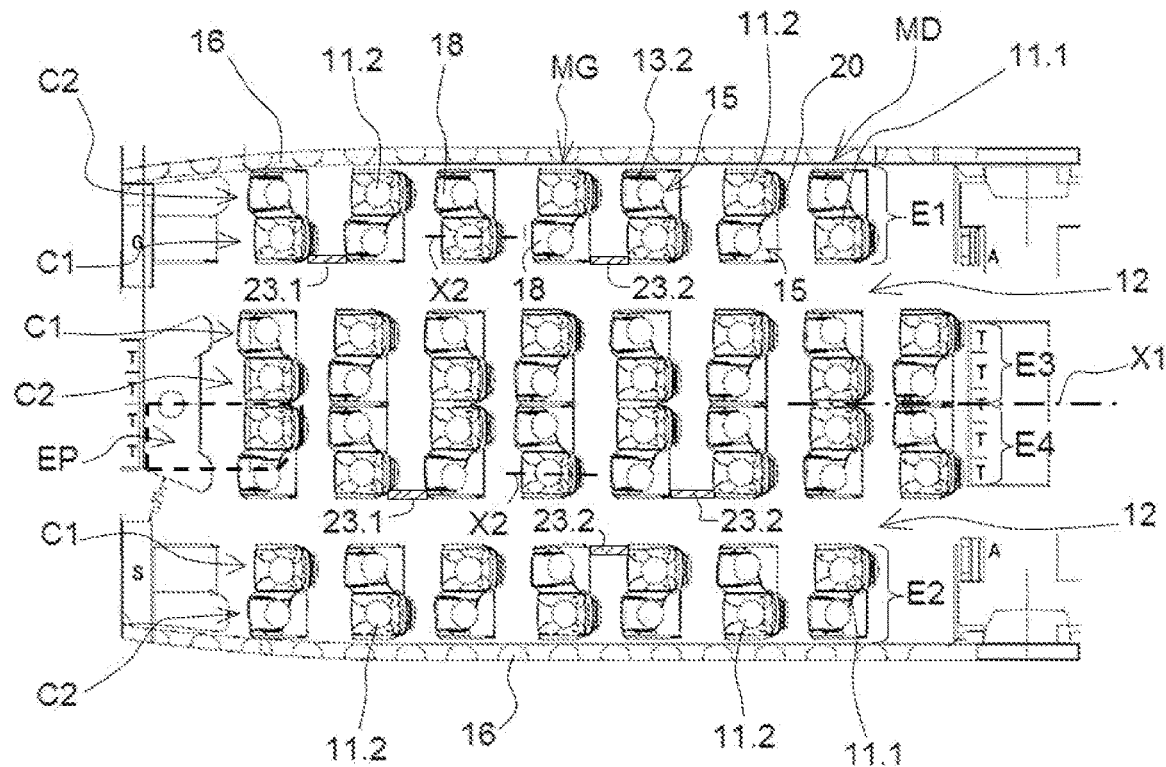

[Fig. 3]
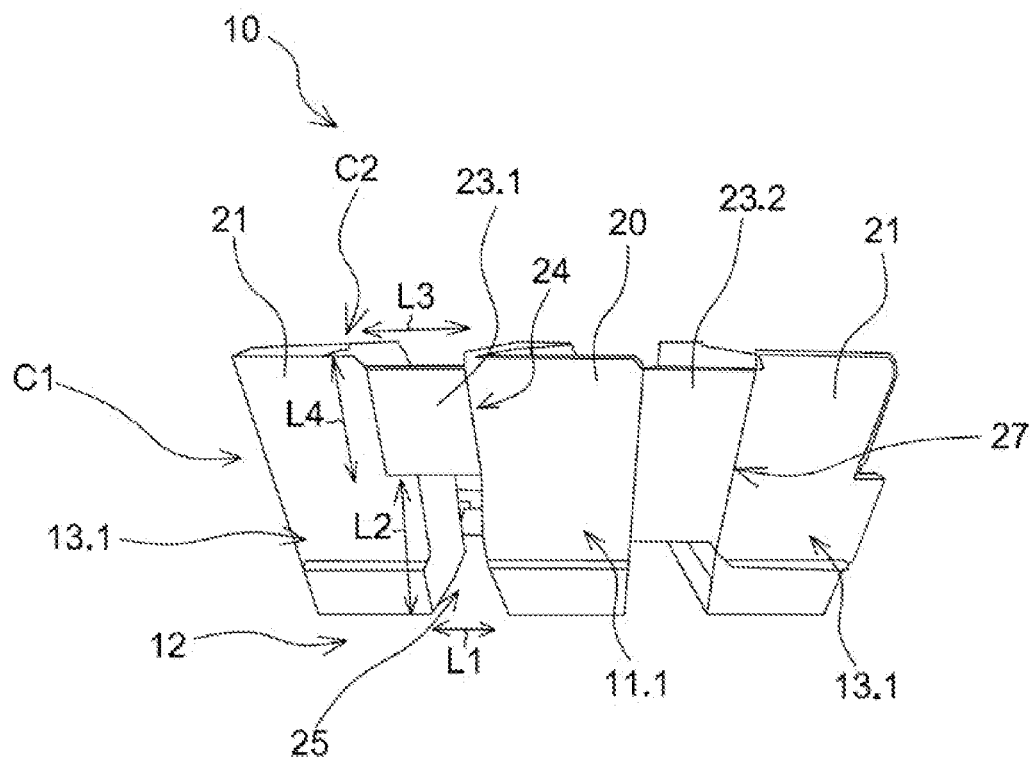
[Fig. 4]
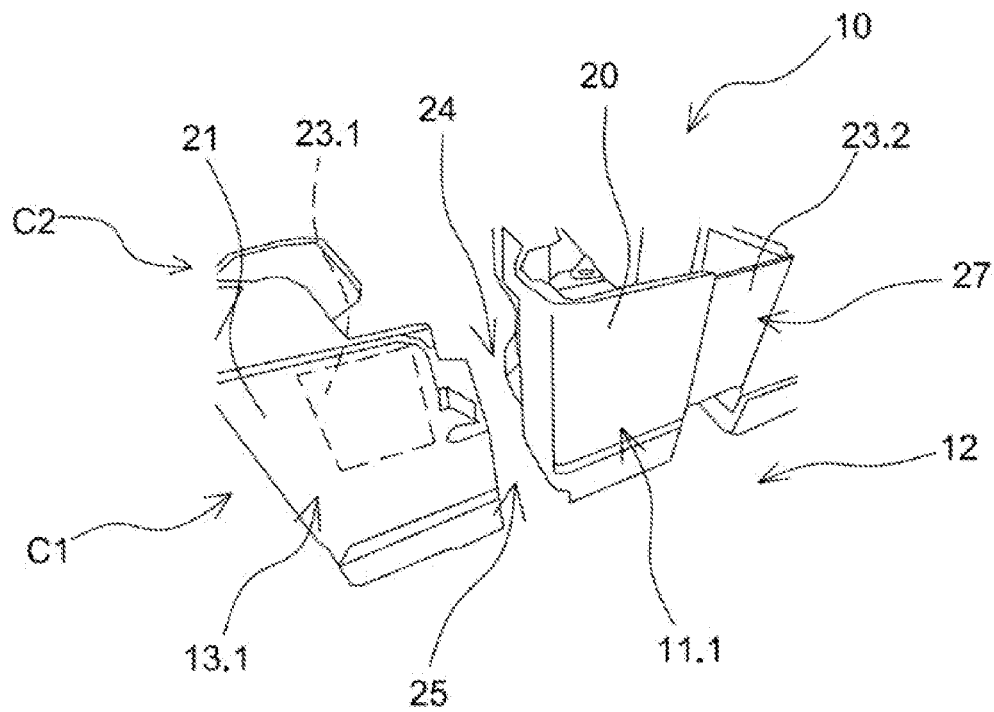

[Fig. 5]
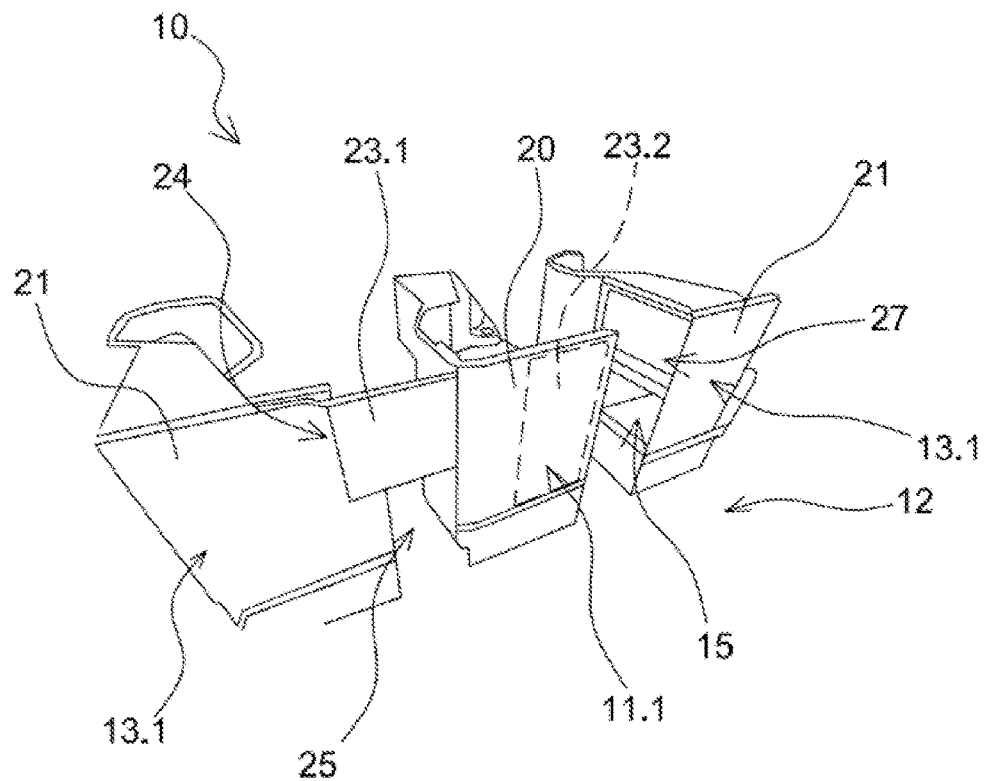
[Fig. 6]
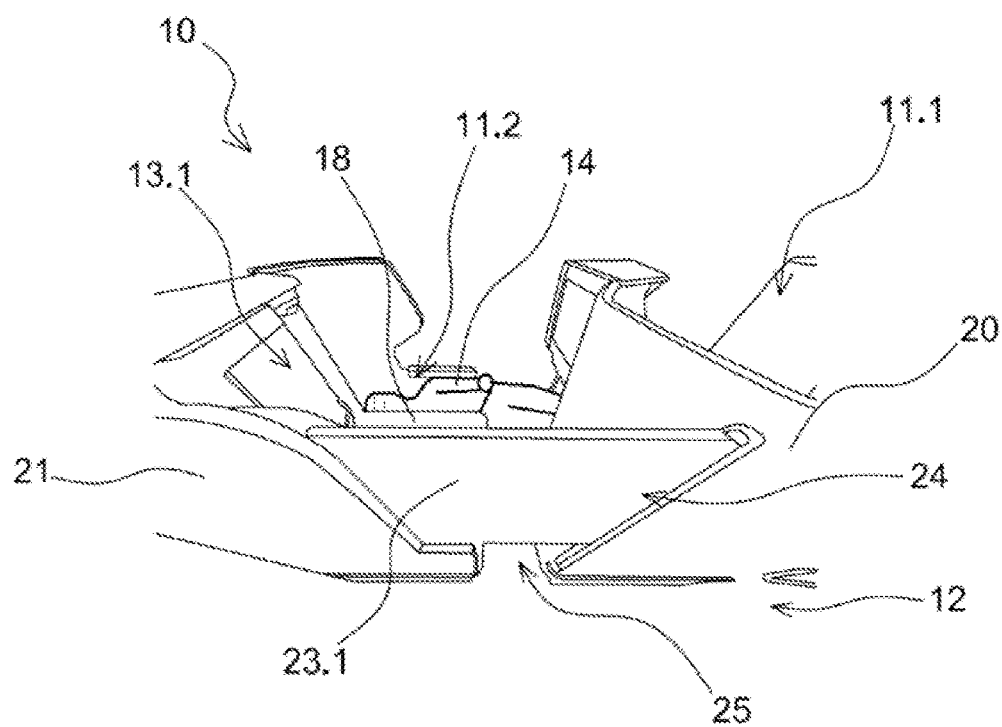

[Fig. 7]
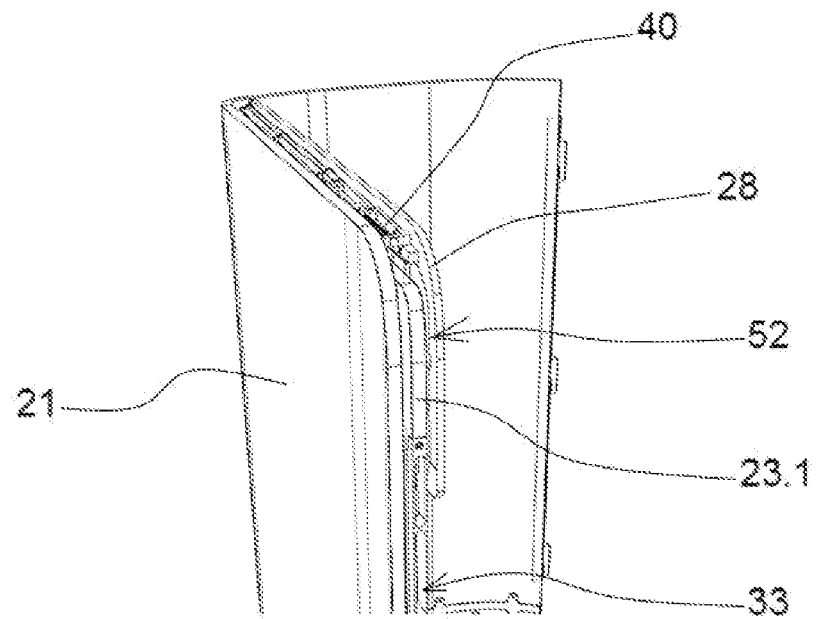
[Fig. 8]
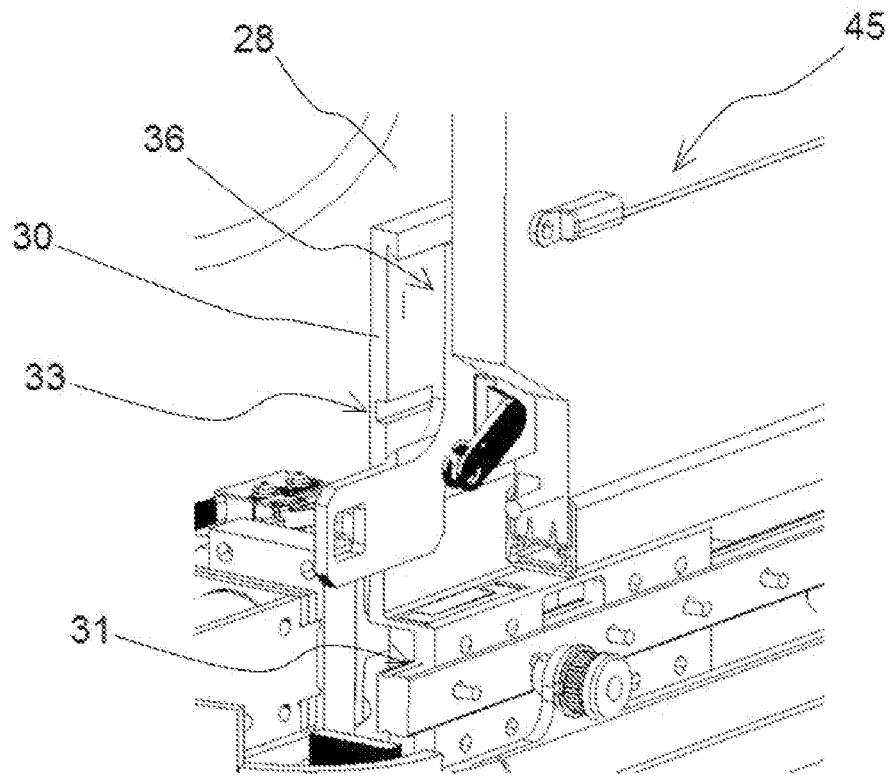

[Fig. 9]
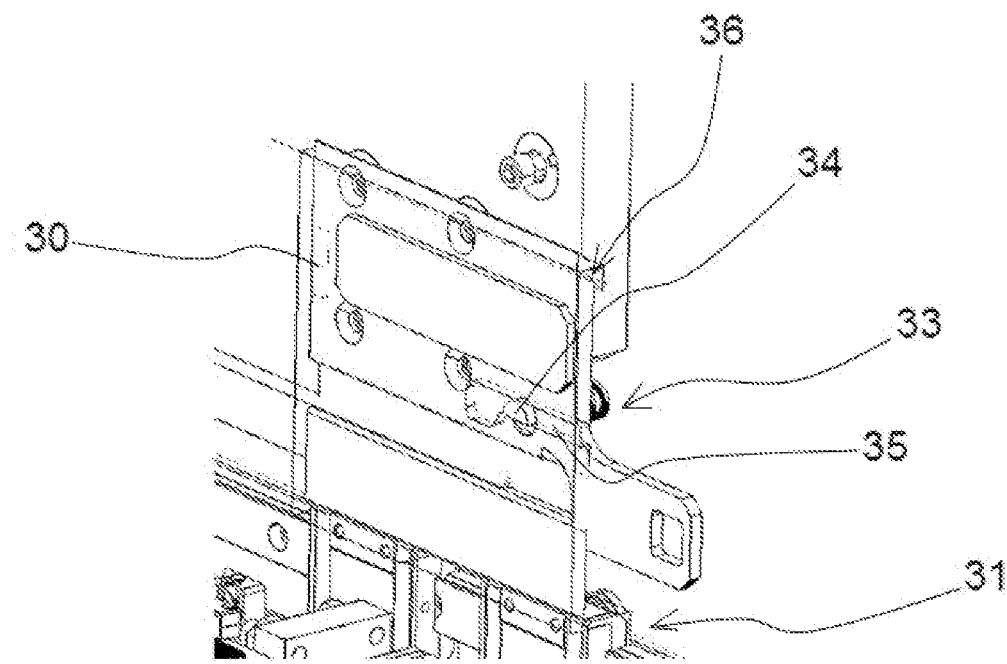
[Fig. 10]
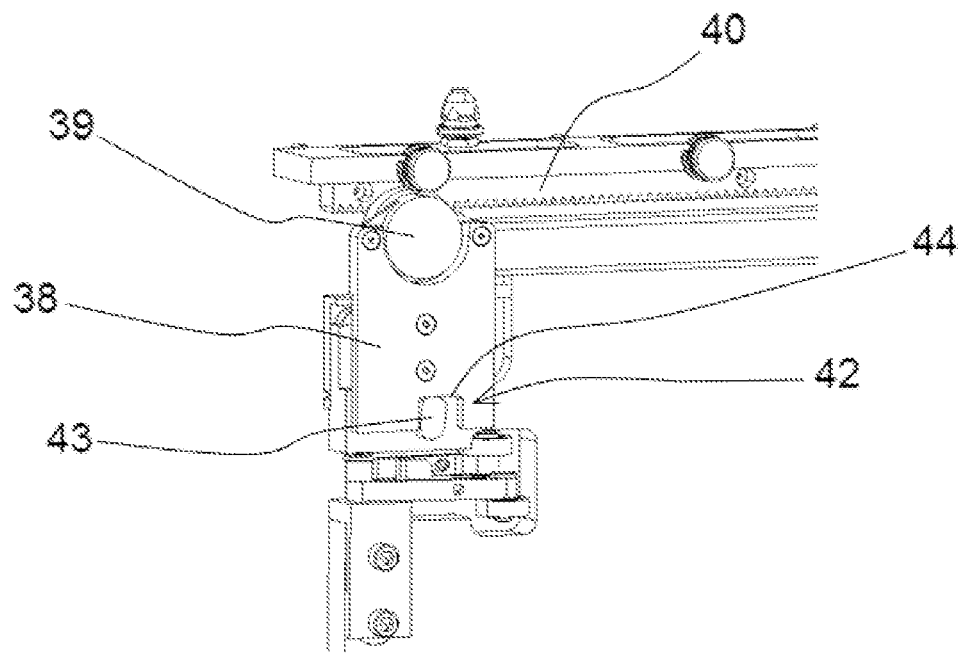

[Fig. 11a]
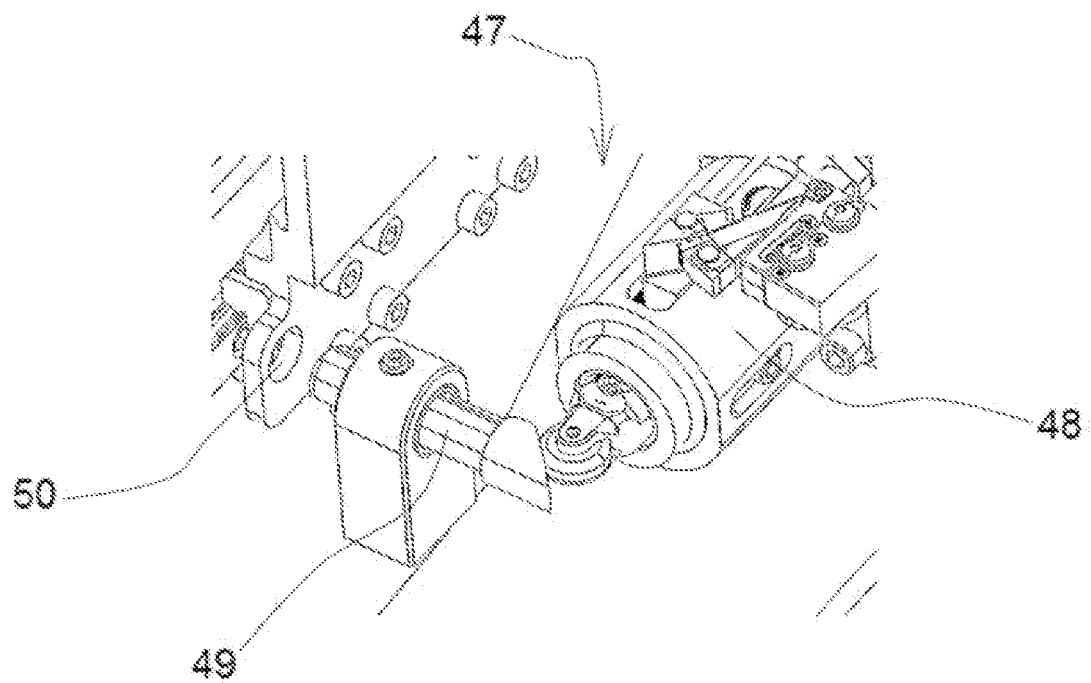
[Fig. 11b]
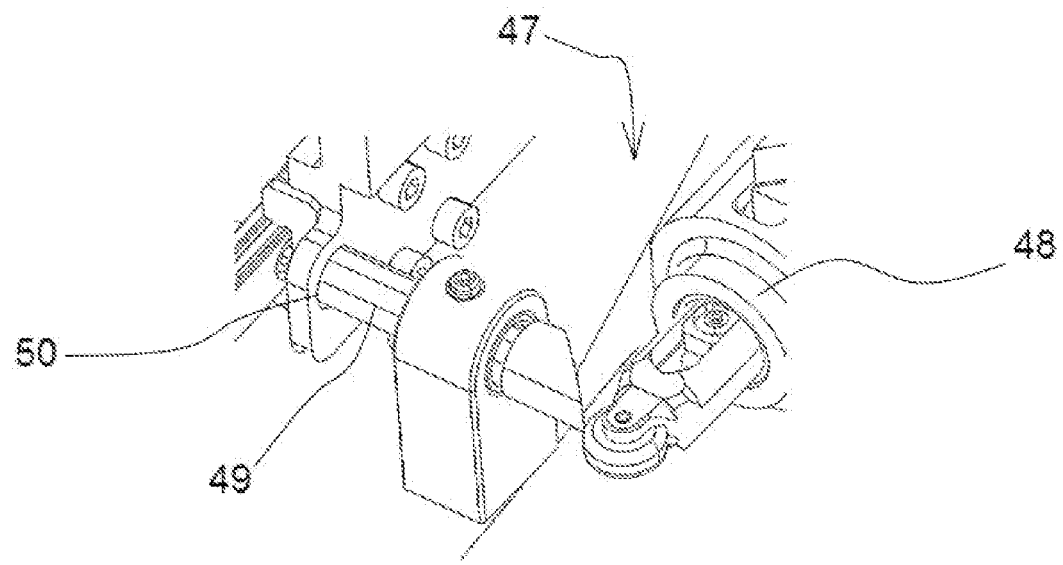

[Fig. 12]
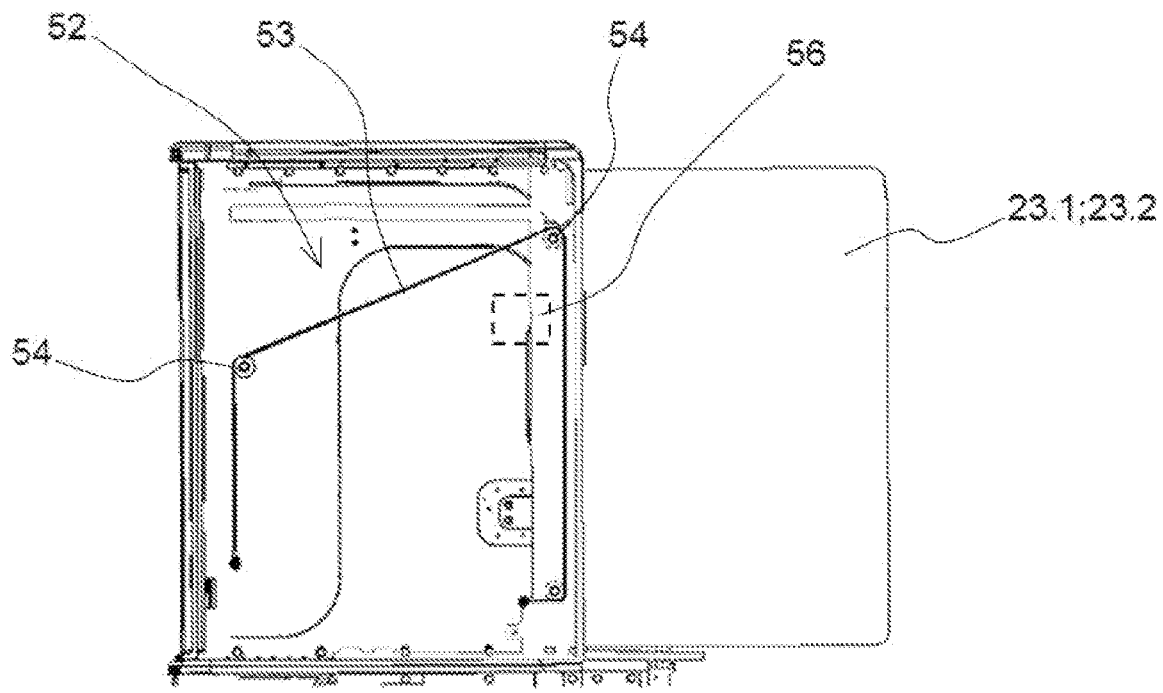

SEAT ARRANGEMENTS, IN PARTICULAR FOR AN AIRCRAFT CABIN

CROSS-REFERENCE TO RELATED APPLICATIONS

This application is a national stage application of International Patent Application PCT/EP2020/069283, filed on Jul. 8, 2020 and titled "SEAT ARRANGEMENTS, IN PARTICULAR FOR AN AIRCRAFT CABIN," which is related to and claims priority to France Patent Application No. 1908144, filed on Jul. 18, 2019, both of which are hereby incorporated by reference in their entireties.

FIELD OF INVENTION

The present invention relates to an arrangement of seats, especially for an aircraft cabin.

BACKGROUND

The seats of the 'business class' and 'first class' type offer passengers different positions of comfort, from a 'seating' position to a 'lying' position, in which the seat defines a substantially horizontal lying surface so that the passenger can lie down.

Intermediate positions of comfort are also available, such as the 'relaxing' position in which a back of the seat is strongly inclined. Generally, these intermediate positions are obtained by inclining the pivoting backrest about a horizontal axis and perpendicular to an axis of extension of the seat. The passenger can then remain in the seat during transitions among the different positions.

Generally, the seat comprises in particular the backrest and a seating surface and is likely to include a legrest and/or a footrest, which can be fixed or linked to a kinematics of the seat.

Arrangements of seats for aircraft cabin of 'business class' and 'first class' type include a passage, disposed between two seat units arranged one behind the other along a longitudinal axis of the aircraft cabin, allowing direct access to an aisle for all passengers. Passengers can thus easily access to the aisle, especially when the seat is in an extended position.

Therefore, when a passenger or a crew member is walking in the aisle located laterally to the seat, s/he is likely to be in direct visual contact with the passenger in the seat. Such a situation can bring a feeling of discomfort to the passenger in the seat, in that s/he feels a lack of privacy.

Document US2018/0281963 describes a device for closing a passage between two seat units arranged one behind the other. This closing device comprises a door mounted so as to slide between a stored position, in which the door leaves the passage unobstructed, and an extended position, in which the door closes the passage. Such a configuration makes it possible to define an enclosed interior space around the seat, providing thereby a feeling of privacy to the passenger. According to such a configuration of the state of the art, the passenger in the seat is not in direct sight of other passengers and/or crew members walking in the aisle. Documents EP3225548 and GB2548901 describe a similar closing device.

However, it is not easy to integrate such doors into a configuration of seats including at least two columns in which the seats are staggered. In fact, certain passages for getting access to a seat in the furthest column from the aisle do not allow the integration of a conventional door extending almost along the entire height of the seat module, because it is difficult to comply with the safety constraints imposed by aeronautical standards due to the short length of the passage.

SUMMARY

The invention aims at effectively remedying this drawback by providing an arrangement of seats, in particular for an aircraft cabin, comprising:
   at least a first column of seats extending from one side of an aisle and comprising seats arranged one behind the other in alternation with consoles, a console being provided with a foot zone for receiving the feet of a passenger in a corresponding rear seat in the first column,
   at least a second column of seats extending from a side opposite to the aisle and comprising seats arranged one behind the other in alternation with consoles, a console being provided with a foot zone for receiving the feet of a passenger in a corresponding rear seat in the second column,
   the seats in the second column being staggered with respect to the seats in the first column,
   said arrangement comprising at least one door movable between a stored position and a deployed position in which the door closes an upper space above a console in the first column, said upper space being delimited on the one hand by a shell associated with said console and on the other hand by a shell associated with a front seat,
   a lower space extending between a front end of the console and the shell of the front seat being left free,
   the lower space being in communication with the upper space to form an access passage between the aisle and a seat in the second column when the door is in the stored position.

The invention thus makes it possible to guarantee the privacy of the passengers in a configuration of seats in a staggered arrangement along two columns, while respecting the safety regulations due to the lower space left free between the console and the front seat, allowing thereby evacuation in case of emergency.

According to one embodiment, the interior space left free has a length of at least 9 inches (22.86 cm).

According to one embodiment, the lower space left free has a height between 25 inches (63.50 cm) and 30 inches (76.20 cm).

According to one embodiment, the door and the upper space have a length between 15 inches (38.10 cm) and 20 inches (50.80 cm).

According to one embodiment, the door and the upper space have a height between 14 inches (35.56 cm) and 20 inches (50.80 cm).

According to one embodiment, said arrangement comprises at least a second door movable between a stored position and an extended position in which the door closes a space extending between a shell of a seat and a rear end of a console in the first column, this space forming an access passage between the aisle and a seat in the first column, when the door is in the stored position.

According to one embodiment, at least one space extending between a console and a seat in the first column may be without a door.

According to one embodiment, in particular at one end of a column of seats, a premium space comprises a bed space and/or an increased seating space and/or a movie space.

According to one embodiment, the door is arranged between a portion of a shell and a fixed support carrying a guiding slide, a rack, components of an automatic deployment system, as well as components of a system for locking and unlocking the door.

According to one embodiment, the door comprises a carriage mounted so as to be mobile in translation along a guiding slide in order to allow the door to move from one position to another.

According to one embodiment, the arrangement comprises a system for locking and unlocking the door relative to the carriage.

According to one embodiment, the door comprises a second carriage provided with a damping pinion for damping a movement of the door and cooperating with a rack.

According to one embodiment, the second carriage comprises a locking and unlocking system capable of assuming a locked state in which said system maintains the second carriage in a high position so that the teeth of the damping pinion cooperate with the rack, and an unlocked state allowing a movement of said second carriage to a low position so that the teeth of the damping pinion are released from the rack.

According to one embodiment, said arrangement comprises a control device, in particular including cables, capable of controlling a change of state of at least one locking and unlocking system.

According to one embodiment, said arrangement comprises a system for locking the door in the stored position which can be actuated by a crew member.

According to one embodiment, said arrangement comprises a system for automatically deploying the door from a stored position to a deployed position.

The object of the invention is also an aircraft comprising an arrangement of seats as defined above.

BRIEF DESCRIPTION OF THE DRAWINGS

The invention will be better understood and other characteristics and advantages will appear by reading the following detailed description, which includes embodiments given for illustrative purposes with reference to the accompanying figures, presented as way of non-limiting examples, which may serve to complete the understanding of the present invention and the description of its implementation and eventually contribute to its definition, wherein:

FIG. 1 is a top view of an arrangement of seats according to the present invention;

FIG. 2 is a top view of an aircraft cabin incorporating an arrangement of seats according to the present invention;

FIG. 3 is a side view illustrating the two types of doors which can be used in the arrangement of seats according to the invention;

FIG. 4 is a side view showing a small door for getting access to a seat in the furthest column from the aisle in the stored position;

FIG. 5 is a side view showing a large door for getting access to a seat in the closest column to the aisle in the stored position;

FIG. 6 is a perspective view of a seat in the furthest column from the aisle in the extended position;

FIG. 7 is a perspective view illustrating the integration of a door and its operating mechanism between a shell and its support;

FIG. 8 is a detailed perspective view of a guiding carriage for the door according to the invention;

FIG. 9 is a perspective view of the system for locking and unlocking the guiding carriage for the door according to the invention;

FIG. 10 shows a perspective view of the upper carriage of the door according to the invention provided with a damping pinion cooperating with a rack;

FIGS. 11a and 11b show a perspective view of a locking system for the door according to the invention respectively in the released position and in the locked position;

FIG. 12 shows a side view of a system for automatically deploying a closing door for a space according to the invention.

DETAILED DESCRIPTION

It should be noted that, in the figures, the structural and/or functional elements common to the different embodiments may have the same references. Thus, unless otherwise stated, such elements have identical structural, dimensional and material properties.

FIG. 1 shows an arrangement of seats 10, in particular for an aircraft cabin, comprising at least a first column C1 of seats 11.1 extending from the side of an aisle 12. The first column C1 comprises seats 11.1 arranged one behind the other in alternation with consoles 13.1. A console 13.1 is provided with a foot zone 15 for receiving the feet of a passenger 14 in a corresponding rear seat 11.1 in the first column C1.

At least a second column C2 of seats 11.2 extends from an opposite side of the aisle 12. The second column C2 comprises seats 11.2 arranged one behind the other in alternation with consoles 13.2. A console 13.2 is provided with a foot zone 15 for receiving the feet of a passenger 14 in a corresponding rear seat 11.2 in the second column C2.

The seats 11.1 in the first column C1 and the seats 11.2 in the second column C2 are turned in the same direction D which may correspond to the direction of movement of the aircraft. As a variant, the orientation direction of the seats 11.1, 11.2 may correspond to an opposite direction to the movement of the aircraft, or any other direction.

A column of seats C1, C2 extends longitudinally inside the aircraft. A column of seats C1, C2 can extend along a longitudinal axis of the aircraft cabin X1 or along an axis parallel to the longitudinal axis of the aircraft cabin X1, as shown in FIG. 2.

It should be noted that, in the remainder of the description, the terms 'front' and 'rear' used in relation to the term 'seat' or 'console' locally define a relative position of the seat or of the console inside a column C1, C2 and do not refer in any way to an orientation of the seat or the console inside the aircraft cabin. In other words, the expression 'front seat' means that the front seat is positioned directly in front of another seat inside the column C1, C2, while the expression 'rear seat' means that the seat is positioned directly behind another seat inside the column C1, C2.

Inside a column, each seat 11.1, 11.2 has an axis X2 which may be parallel to the longitudinal axis of the aircraft cabin X1. Alternatively, the axis X2 of a seat 11.1, 11.2 may form an angle, for example between 0 and 20 degrees, with respect to the longitudinal axis of the aircraft cabin X1. The axis X2 of a seat 11.1, 11.2 corresponds to an intersection of a vertical plane of symmetry of the seat 11.1, 11.2 with a corresponding horizontal plane.

The column C1 in the arrangement of seats 10 may be arranged on the side of the aisle 12, while the second column C2 may be arranged on the side of the fuselage 16. Thus, in the arrangement in FIG. 2, one distinguishes a first set E1 of two columns of seats C1, C2 and a second set E2 of two columns of seats C1, C2, symmetrical to the longitudinal axis of the aircraft cabin X1. Each set E1, E2 has a column of seats C2 arranged on the side of the fuselage 16. There are also two central sets E3, E4 in two columns C1, C2 symmetrical to the longitudinal axis of the aircraft cabin X1.

A seat 11.1,11.2 is convertible between a 'seating' position, corresponding to the position used in particular during the stopping, take-off, and landing phases of the aircraft, and a 'lying' position', in which the seat 11.1, 11.2 defines a substantially horizontal plane for the passenger 14 in order to allow her/him to rest, as shown in FIG. 6. In particular, the 'seating' position and the 'lying' position are two extreme positions of the seat 11.1, 11.2. According to alternative embodiments, the seat 11.1, 11.2 may also assume intermediate positions, called relaxing positions, between these two extreme positions.

Preferably, the seats 11.2 in the second column C2 and the seats 11.1 in the first column C1 are in a staggered arrangement, that is to say the seats 11.1, 11.2 are not laterally aligned from one column relative to the other.

In each column of seats C1, C2, a console 13.1, 13.2 is provided with a foot zone 15 for receiving the feet of a passenger 14 in a corresponding rear seat 11.1, 11.2, in particular when the seat 11.1, 11.2 is in a lying position. Thus, the opening of the foot zone 15 is directed towards the seat 11.1, 11.2 immediately behind the corresponding console 13.1, 13.2.

A given console 13.1, 13.2 is arranged near a seat 11.1, 11.2 of the other column so as to define a space for storing and/or placing objects. A console 13.1, 13.2 includes for this purpose a flat upper wall 18 on which the passenger 14 in the adjacent seat 11.1, 11.2 can in particular place objects. The upper wall 18 can thus serve as a table, a working surface, a dining table, a cocktail table or any other usable surface for a passenger 14 in the adjacent seat 11.1, 11.2 in the other column. The console 13.1, 13.2 may also include storage spaces such as magazine rack, drawers, or the like.

A console 13.1, 13.2 and an adjacent seat 11.1, 11.2 in the other column may form a seat module MD, MG. There is a right seat module MD in which the console 13.2 is arranged on the right of the corresponding seat 11.1 and a left seat module MG in which the console 13.1 is arranged on the left of the corresponding seat 11.2. It is thus possible to form the set of two columns C1, C2 by alternately arranging a right module MD and a left module MG one behind the other.

A seat 11.1, 11.2 is associated with a privacy shell 20 for the passenger 14. A console 13.1, 13.2 is also associated with a privacy shell 21. The shells 20 and 21 of a seat 11.1, 11.2 and a console 13.1, 13.2 of the same module MD, MG can be made in one piece.

As can be seen in FIGS. 3, 4, 5, and 6, at least one door 23.1 is movable between a stored position and a deployed position in which the door 23.1 closes an upper space 24 above a console 13.1 in the first column C1. This upper space 24 is delimited on the one hand by the shell 21 associated with the console 13 and on the other hand by the shell 20 associated with the front seat 11.1.

A lower space 25 extending between the front end of the console 13.1 and a shell 20 of the front seat 11.1 is left free, that is to say this lower space 25 has no door. The lower space 25 is preferably left free along the entire height of the console 13.1. The lower space 25 is narrower than the upper space 24. The lower space 25 is in communication with the upper space 24 so as to form an access passage between the aisle 12 and a seat 11.2 in the second column C2 when the door 23.1 is in the stored position.

Thus, the door 23.1 is arranged in the free space above the console 13.1, in particular above a surface of the console 13.1 forming a table. This makes it possible to facilitate the integration of the door 23.1, which would otherwise reduce, due to its thickness, the available width of the seat 11.2 and/or the console 13.1. In addition, this makes it possible to maximize the space under the first door 23.1 associated with a seat 11.2 remote from the aisle 12 for an evacuation in the event of an emergency. As a passenger can thus easily pass under a door 12.1, it is not necessary to carry out an evacuation test for the doors 12.1.

According to an exemplary embodiment, the lower space 25 left free has a length L1 of at least 9 inches (22.86 cm), and a height L2 between 25 inches (63.50 cm) and 30 inches (76.20 cm). The door 23.1 and the upper space 24 have a length L3 between 15 inches (38.10 cm) and 20 inches (50.80 cm) and a height L4 between 14 inches (35.56 cm) and 20 inches (50.80 cm).

In addition, at least a second door 23.2 is movable between a stored position and an extended position in which the door 23.2 closes a space 27 extending between a shell 20 of a seat 11.1 and a rear end of a console 13.1 in the first column C1. This space 27 forms an access passage between the aisle 12 and a seat 11.1 in the first column C1, when the door 23.2 is in the stored position.

The first door 23.1 is smaller than the second door 23.2. In particular, the first door 23.1 has a height L4, measured in a vertical direction, inferior to the height of the second door 23.2.

When a door 23.1, 23.2 is in the deployed position, the corresponding access passage between the aisle 12 and a seat 11.1 in the first column C1 or a seat 11.2 in the second column C2 is closed by the door 23.1, 23.2. Consequently, the passenger 14 in the seat 11 is separated from any passenger and/or crew member walking in the aisle 12 by the door 23.1, 23.2 and the privacy shells 20 and 21. The passenger 14 is then seated in a privacy zone defined by the enclosed space thus created.

Some spaces between consoles 13.1 and seats 11.1 in the first column C1 may however be without a door 23.1, 23.2. This may be in particular the case for bottom-of-the-range seats 11.1, 11.2 compared to those associated with a closing door 23.1, 23.2.

Furthermore, a premium space EP may be provided, in particular at one end of a column of seats C1, C2. This premium space EP may include a bed space and/or an increased seating space and/or a movie space.

As shown in FIG. 7, a door 23.1 is disposed between a portion of a shell 21 and a fixed support 28 carrying a guiding slide 31, a rack 40, components of an automatic deployment system 52, as well as components of a system 33 for locking and unlocking the door 23.1 described in more detail below.

As can be seen in FIG. 8, a door 23.1, 23.2 comprises a carriage 30 mounted so as to be mobile in translation along a guiding slide 31 in order to allow the door 23.1, 23.2 to move from the stored position to the deployed position and vice versa.

A system 33 enables the door 23.1, 23.2 to be locked and unlocked if necessary relative to the carriage 30. According to an exemplary embodiment, the locking and unlocking system 33 comprises a rotary cam 34 mounted on the door 23.1, 23.2, as shown in FIG. 9. The cam 34 is rotatably movable between a locking position in which the cam 34 abuts against one end of a release groove 35 and an unlocked position in which the axis of the cam 34 is aligned with the groove 35, so as to be able to slide inside the groove 35. This makes it possible to ensure a relative movement of the door 23.1, 23.2 with respect to the carriage 30.

A sliding system 36, for example with a rib and a corresponding groove, may make it possible to facilitate the movement of the door 23.1, 23.2 relative to the carriage 30 to ensure the clearance of the access passage.

As illustrated by FIG. 10, the door 23.1, 23.2 comprises a second carriage 38 provided with a damping pinion for damping a movement of the door 23.1, 23.2 and cooperating with a rack 40 mounted on the fixed support 28. The damping pinion 39 may have the form of a friction pinion of a known type.

The second carriage 38 comprises a second system 42 for locking and unlocking the second carriage 38 and capable of assuming a locked state in which said system 42 maintains the second carriage 38 in a high position so that the teeth of the damping pinion 39 cooperate with the rack 40, and an unlocked state allowing movement of said second carriage 38 to a low position so that the teeth of the damping pinion 39 are released from the rack 40. The system 42 may include for example a cam 43, the displacement of which relative to a notch 44 makes it possible to pass from one position to another.

A control device 45, in particular including cables, is able to control a change of state of at least one locking and unlocking system 33, 42 via a displacement of at least one cam 34, 43 of the corresponding system. The movement of the cam 34, 43 may be controlled in particular by actuating an unlocking member, such as a button or a lever, integrated on one side of the door 23.1, 23.2.

Furthermore, as shown in FIGS. 11*a* and 11*b*, a locking system 47 allows the door 23.1, 23.2 to be locked in the stored position. This locking system 47 is intended for use by a crew member in order to ensure in particular that the door 23.1, 23.2 is in the stored position when the seat 11.1, 11.2 is in the TTL position (Taxi, Take-off, Landing) during the stopping, take-off and landing phases of the aircraft.

The locking system 47 comprises a linear electric actuator 48 capable of moving a rod 49 in translation between a released position in which the rod 49 is released from a corresponding housing 50 provided in a portion of the first carriage 30 (cf. FIG. 11*a*) and a blocking position in which the rod 49 penetrates inside the housing 50 of the carriage 30 to prevent the door 23.1, 23.2 from moving (cf. FIG. 11*b*), under normal operating conditions.

The electric actuators 48 can be controlled by a centralized system allowing the crew members to block all of the doors 23.1, 23.2 in the stored position, in a single control operation.

Advantageously, an automatic deployment system 52 for the door 23.1, 23.2 is shown in FIG. 12. The automatic deployment system 52 comprises an elastic strap 53 and a plurality of guiding means 54 for the strap 53, such as pulleys, arranged between a first end of said strap 53 fixed on the door 23.1, 23.2 and a second end of said strap 53 fixed on the fixed support 28. An action by the passenger 14 on a control button 56 on the side of the seat 11.1, 11.2 allows the strap 53 to be released and the door 23.1, 23.2 to pass automatically in the deployed position.

Of course, the different characteristics, variants and/or embodiments of the present invention can be associated with each other in various combinations insofar as they are not incompatible or mutually exclusive.

Obviously, the invention is not limited to the embodiments described above and provided solely by way of example. It encompasses various modifications, alternative forms and other variants which a person skilled in the art may envisage in the context of the present invention and in particular any combination of the various operating modes described above may be taken separately or in combination.

The invention claimed is:

1. An arrangement of seats for an aircraft cabin, the arrangement of seats, comprising:
   at least a first column of seats extending on one side of an aisle and comprising a first set of seats and consoles arranged one behind the other in a straight line, each console having a front end and a rear end, the rear end of each console being provided with a foot zone for receiving the feet of a passenger in a corresponding rear seat in the first column;
   at least a second column of seats located adjacent to the first column of seats and the side of a fuselage, the second column of seats extending parallel to the first column of seats, the second column of seats comprising a second set of seats and consoles arranged one behind the other in a straight line, each console having a front end and a rear end, the rear end of each console being provided with a foot zone for receiving the feet of a passenger in a corresponding rear seat in the second column, the seats in the second column being in a staggered arrangement with respect to the seats in the first column so that each seat of the first column is arranged adjacent to a console of the second column and each seat of the second column is adjacent to a console of the first column;
   at least one first door movable between a stored position and an extended position in which the at least one first door closes an upper space above a console in the first column of seats, said upper space being delimited on the one hand by a shell associated with the console and on the other hand by a shell associated with a front seat in the first column of seats;
   a lower space extending between the front end of each console in the first column of seats and the shell of the corresponding front seat being left free along the entire height of the corresponding console, the lower space having no door so that the lower space is left free when the first door is in the extended position;
   wherein the lower space in communication with the upper space forms an access passage between the aisle and a seat in the second column when the at least one first door is in the stored position; and
   at least one second door movable between a stored position and a deployed position in which the at least one second door closes a free space extending between a shell of the rear seat and the rear end of the console in the first column of seats, the free space forming an access passage between the aisle and the rear seat in the first column, when the at least one second door is in the stored position, wherein the at least one first door is smaller than the at least one second door,
   wherein the at least one first door or the at least one second door comprises a first carriage mounted so as to be mobile in translation along a guiding slide in order to allow the at least one first door or the at least one second door to move from one position to another,
   wherein the at least one first door or the at least one second door comprises a second carriage provided with a damping pinion for damping a movement of the at least one first door or the at least one second door and cooperating with a rack,
   wherein the second carriage comprises a locking and unlocking system capable of assuming a locked state in which said system maintains the second carriage in a high position so that teeth of the damping pinion cooperate with the rack, and an unlocked state allowing said second carriage to move to a low position so that teeth of the damping pinion are released from the rack, wherein the locking and unlocking system includes a cam and a notch, a displacement of the cam relative to the notch allowing the second carriage to pass from one position to another.

2. The arrangement of seats according to claim 1, wherein the lower space left free has a length of at least 9 inches (22.86 cm).

3. The arrangement of seats according to claim 1, wherein the lower space left free has a height between 25 inches (63.50 cm) and 30 inches (76.20 cm).

4. The arrangement of seats according to claim 1, wherein the at least one first door and the upper space have a length between 15 inches (38.10 cm) and 20 inches (50.80 cm).

5. The arrangement of seats according to claim 1, wherein the at least one first door and the upper space have a height between 14 inches (35.56 cm) and 20 inches (50.80 cm).

6. The arrangement of seats according to claim 1, wherein at one end of the first column of seats and/or the second column of seats, a premium space comprises a bed space and/or an increased seating space and/or a movie space.

7. The arrangement of seats according to claim 1, wherein the at least one first door or the at least one second door is disposed between a portion of the shell of the console and a fixed support carrying a guiding slide, a rack, components of an automatic deployment system, as well as components of a system for locking and unlocking the at least one first door or the at least one second door.

8. The arrangement of seats according to claim 1, further comprising a system for locking and unlocking the at least one first door or the at least one second door relative to the carriage.

9. The arrangement of seats according to claim 8, further comprising a control device including cables, capable of controlling a change of state of at least one locking and unlocking system.

10. The arrangement of seats according to claim 1, wherein it comprises a locking system for the at least one first door or the at least one second door in the stored position, which can be actuated by a crew member.

11. The arrangement of seats according to claim 1, wherein it comprises an automatic deployment system for moving the at least one first door or the at least one second door from a stored position to a deployed position.

12. An aircraft comprising an arrangement of seats as defined in claim 1.

13. The arrangement of seats according to claim 1, wherein the at least one first door has a height measured in a vertical direction inferior to a height of the at least one second door.

* * * * *